United States Patent
Paluri et al.

(10) Patent No.: US 11,134,253 B2
(45) Date of Patent: Sep. 28, 2021

(54) VIDEO COMPRESSION

(71) Applicant: Hewlett-Packard Development Company, L.P., Spring, TX (US)

(72) Inventors: Seethal Paluri, Palo Alto, CA (US);
Carlos Haas, Palo Alto, CA (US);
Madhu Sudan Athreya, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/472,934

(22) PCT Filed: Feb. 2, 2017

(86) PCT No.: PCT/US2017/016256
§ 371 (c)(1),
(2) Date: Jun. 24, 2019

(87) PCT Pub. No.: WO2018/143992
PCT Pub. Date: Aug. 9, 2018

(65) Prior Publication Data
US 2019/0349593 A1 Nov. 14, 2019

(51) Int. Cl.
*H04N 19/27* (2014.01)
*H04N 19/119* (2014.01)
*H04N 19/146* (2014.01)
*H04N 19/176* (2014.01)
*H04N 19/186* (2014.01)
*H04N 19/46* (2014.01)

(52) U.S. Cl.
CPC .......... *H04N 19/27* (2014.11); *H04N 19/119* (2014.11); *H04N 19/146* (2014.11); *H04N 19/176* (2014.11); *H04N 19/186* (2014.11); *H04N 19/46* (2014.11)

(58) Field of Classification Search
CPC .... H04N 19/27; H04N 19/146; H04N 19/186; H04N 19/119; H04N 19/46; H04N 19/176
USPC ..................................... 375/240.02
See application file for complete search history.

(56) References Cited

U.S. PATENT DOCUMENTS

| | | |
|---|---|---|
| 5,544,286 A | 8/1996 | Laney |
| 5,553,160 A | 9/1996 | Dawson |
| 5,737,537 A | 4/1998 | Gardos et al. |
| 6,751,354 B2 | 6/2004 | Foote et al. |
| 7,218,784 B1 | 5/2007 | Zeck et al. |
| 7,765,346 B2 | 7/2010 | DePeuter et al. |

(Continued)

OTHER PUBLICATIONS

Ding, W. et al., Block-based Fast Compression for Compound Images, 2006, <http://citeseerx.ist.psu.edu/viewdoc/download?doi=10.1.1.472.4693&rep=rep1&type=pdf>.

*Primary Examiner* — On S Mung
(74) *Attorney, Agent, or Firm* — HP Inc. Patent Department

(57) ABSTRACT

An example non-transitory computer-readable medium includes instructions. When executed by a processor, the instructions cause the processor to split a video frame into a first frame including blocks classified as natural and a second frame including blocks classified as artificial. The instructions also cause the processor to compress the first frame with a first compression technique. The instructions also cause the processor to compress the second frame with a second compression technique.

19 Claims, 6 Drawing Sheets

(56) References Cited

U.S. PATENT DOCUMENTS

| | | |
|---|---|---|
| 8,520,943 B2 | 8/2013 | Iourcha et al. |
| 2006/0104525 A1* | 5/2006 | Gringeler ............... H04N 19/50 |
| | | 382/239 |
| 2007/0211937 A1 | 9/2007 | Neumann |
| 2008/0199150 A1 | 8/2008 | Candelore |
| 2009/0059078 A1 | 3/2009 | Kim et al. |
| 2017/0163999 A1* | 6/2017 | Li ........................ H04N 19/117 |

* cited by examiner

FIG. 3    300

Determine Whether Each Block Is Natural or Artificial
302

Generate Metadata Identifying Which Blocks Are Artificial and Which Are Natural
304

Compress Natural Blocks with First Compression Technique and Artificial Blocks with Second Compression Technique
306

Transmit Metadata, First Compressed Frame, and Second Compressed Frame
308

FIG. 4                                                                                      400
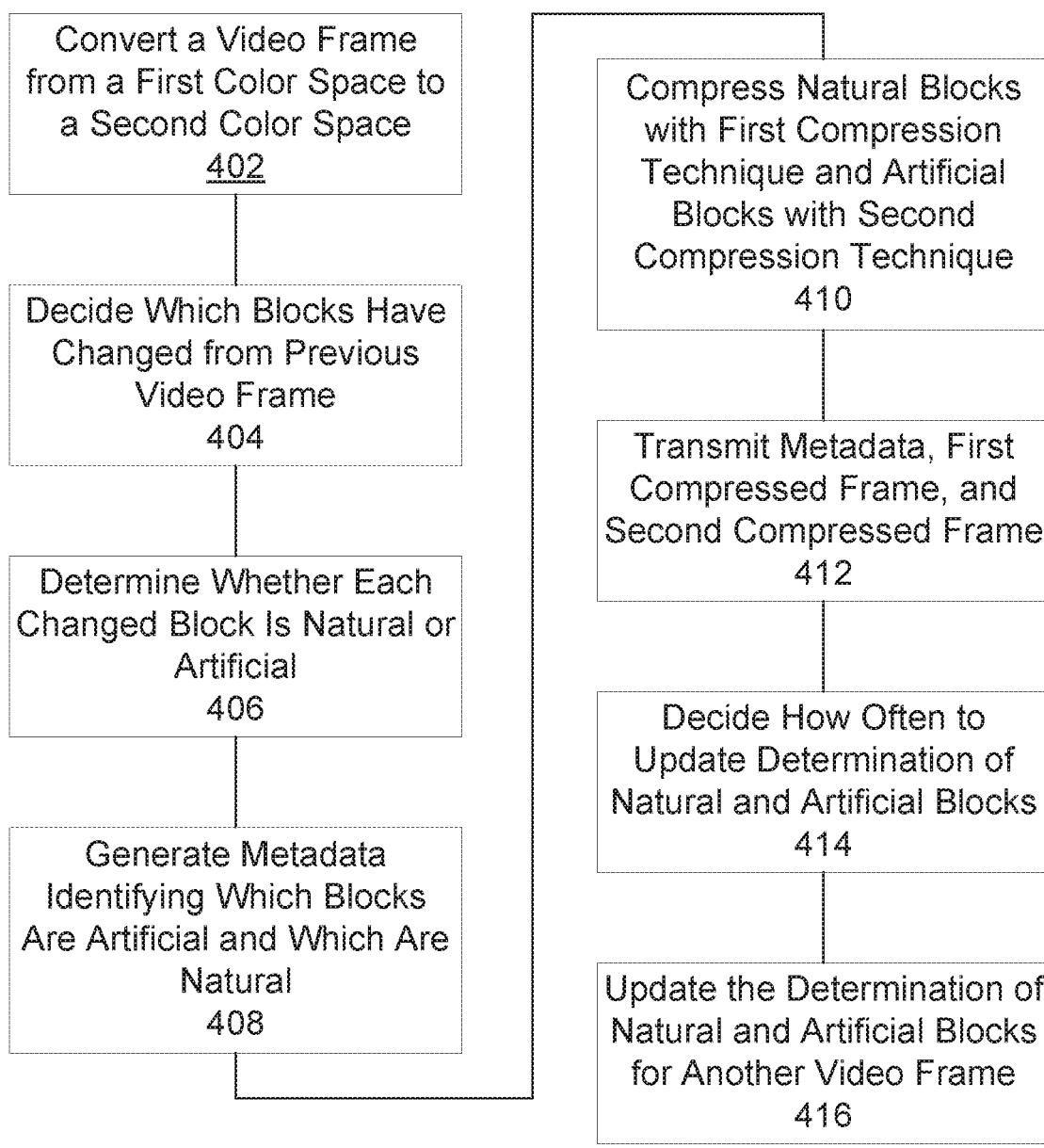

VIDEO COMPRESSION

BACKGROUND

A video may include a plurality of image frames. The video may have a frame rate high enough to create the perception of smooth motion, such as 24 frames per second (fps), 25 fps, 30 fps, 50 fps, 60 fps, or the like. As used herein, the term "frame" refers to a single progressive scan image or a pair of interlace fields. The captured images may include any of various numbers of pixels. The resolution of the images may be specified by the number of pixels in one of the dimensions and the aspect ratio. For example, the images may include 480, 576, 720, 960, 1080, 1440, or the like pixels in a shorter dimension or 3840 (4K), 7680 (8K), or the like pixels in a longer dimension and an aspect ratio of 4:3, 16:9, or the like.

BRIEF DESCRIPTION OF THE DRAWINGS

FIG. 3 is a flow diagram of an example method to compress video efficiently.

FIG. 4 is a flow diagram of another example method to compress video efficiently.

DETAILED DESCRIPTION

Users may prefer high frame rates and high resolutions. However, videos with higher frame rates or higher resolutions may require more bandwidth or more storage space. Accordingly, the video may be compressed to reduce the bandwidth or storage space. For example, the video may be compressed with a Moving Pictures Expert Group (MPEG) standard, H.264, High Efficiency Video Coding (HEVC), or the like. Video compression techniques may have efficiencies that vary depending on what is being compressed. For example, H.264 may perform better on natural videos, and HEVC may perform better on artificial video. As used herein, the term "natural" refers to videos containing content that occurs in nature and video with similar characteristics. For example, natural video may include video captured with a video camera. As used herein, the term "artificial" refers to videos that are not natural. For example, artificial video may include animations, video of contents of a computer desktop, or the like.

In some situations, a designer selecting a compression technique may not know in advance whether the video to be compressed is natural or artificial. As a result, a user may be inconvenienced by being forced to choose the compression technique to use, or an inefficient compression technique may be used. In addition, some video may include natural and artificial components. For example, a desktop may include multiple windows. Some windows may have natural content, and other windows may have artificial content. Accordingly, portions of the video may be compressed less efficiently than they could be.

Figure 1:
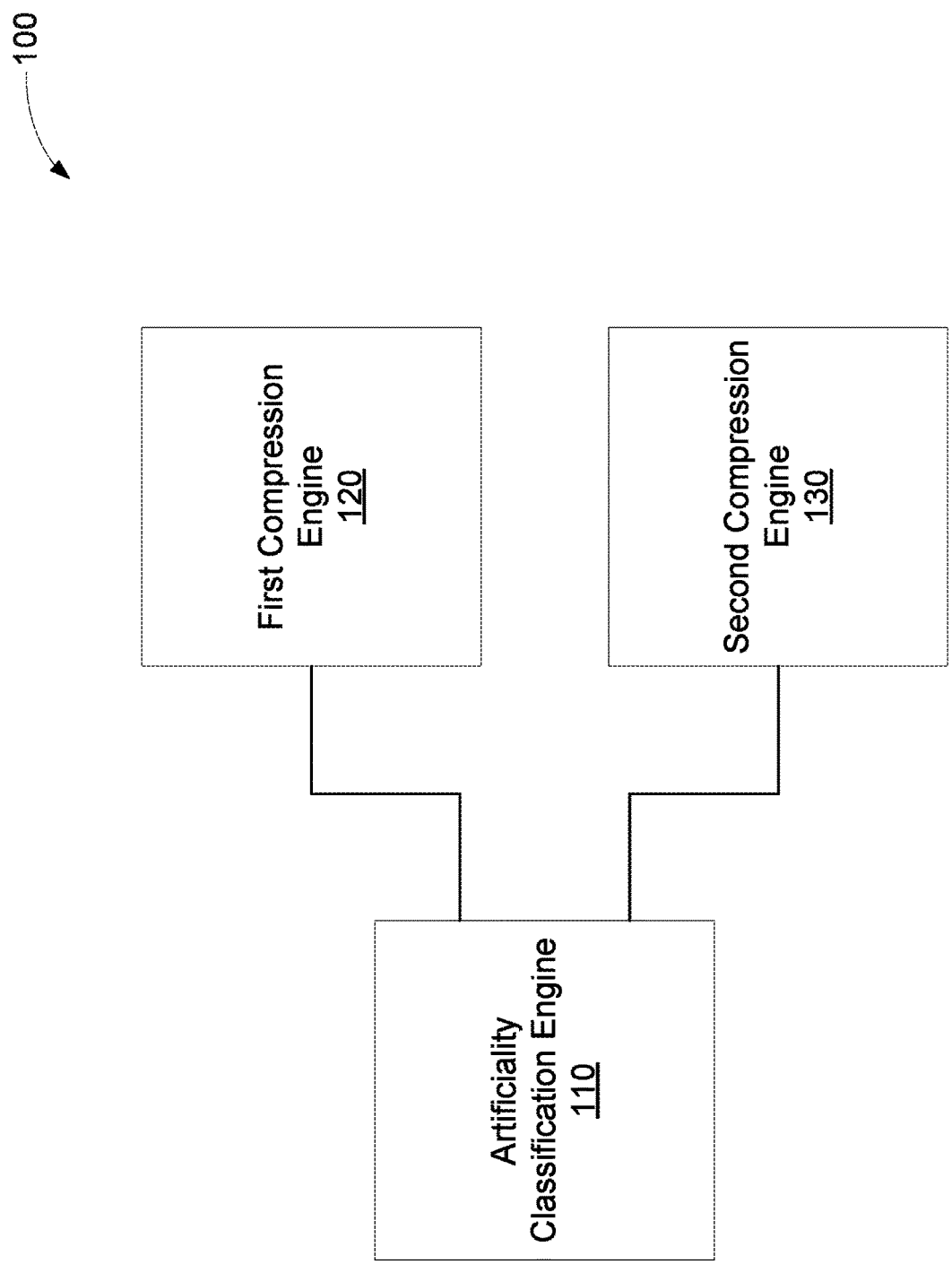
FIG. 1 is a block diagram of an example system to compress video efficiently.

FIG. 1 is a block diagram of an example system 100 to compress video efficiently. The system 100 may include an artificiality classification engine 110. As used herein, the term "engine" refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware. The artificiality classification engine 110 may determine for each block in a video frame whether the block is natural or artificial based on the content of that block. For example, the artificiality classification engine 110 may analyze the pixels in each block and determine based on the pixels whether that block is natural or artificial.

The system 100 may include a first compression engine 120 and a second compression engine 130. The artificiality classification engine 110 may provide the natural blocks to the first compression engine 120 or may indicate to the first compression engine 120 which blocks are natural. Similarly, the artificiality classification engine 110 may provide the artificial blocks to the second compression engine 130 or may indicate to the second compression engine 130 which blocks are artificial. The first compression engine 120 may encode the natural blocks with a first compression technique. The second compression engine 130 may encode artificial blocks with a second compression technique different from the first compression technique.

Figure 2:
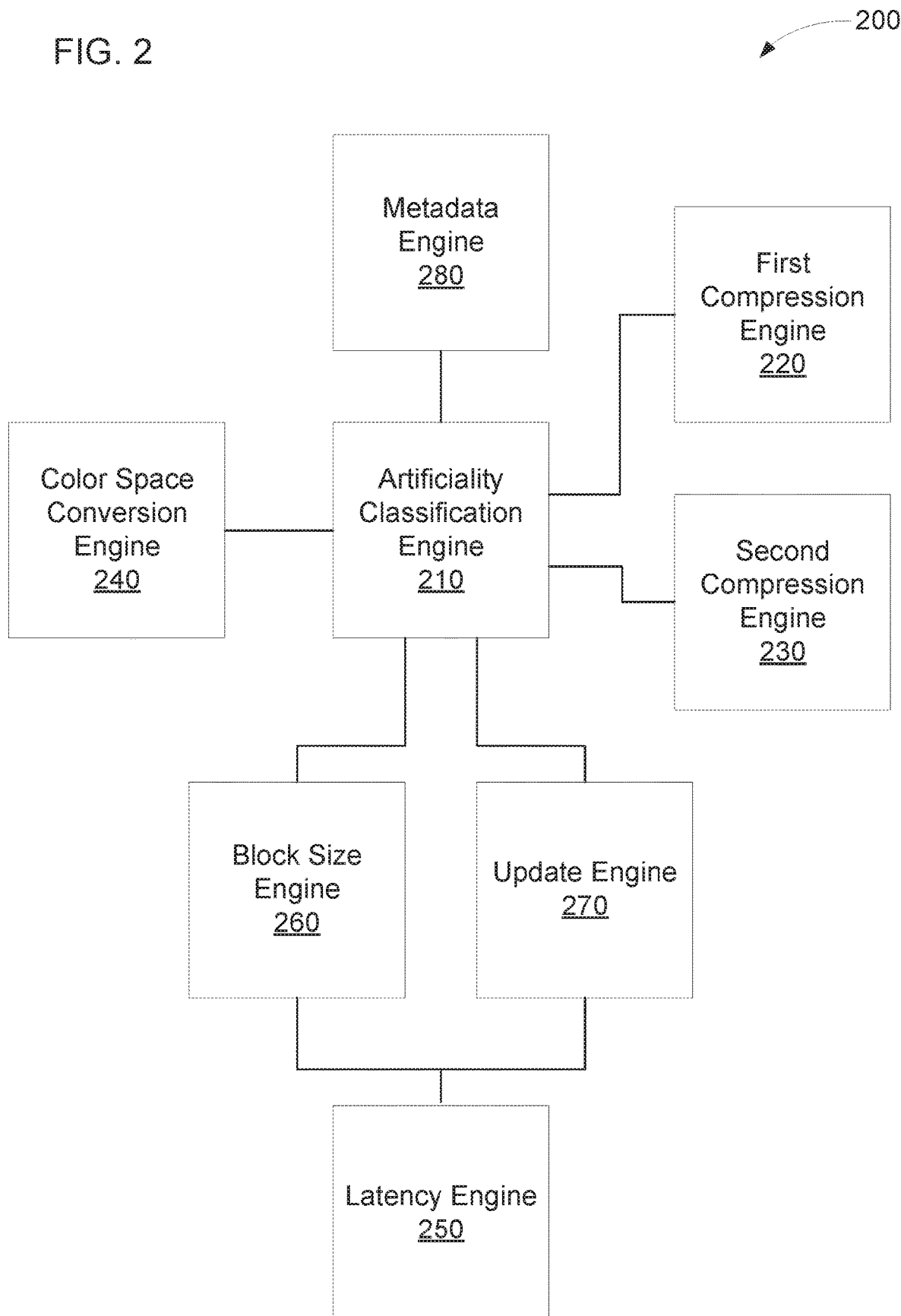
FIG. 2 is a block diagram of another example system to compress video efficiently.

FIG. 2 is a block diagram of another example system 200 to compress video efficiently. The system 200 may include a color space conversion engine 240. The color space conversion engine 240 may convert a video or a video frame from a first color space to a second color space. For example, the color space conversion engine 240 may convert the video or video frame from a red, green, blue (RGB) color space to a luma, chroma (YCBCR) color space or from a YCBCR color space to an RGB color space. The color space conversion engine 240 may provide the converted video frame or the original video frame to an artificiality classification engine 210.

In some examples, the artificiality classification engine 210 may initially decide which blocks in a video frame have changed from a previous video frame. For example, the artificiality classification engine 210 may perform a pixel-by-pixel comparison of each block between the previous video frame and current video frame to determine whether that block has changed. The artificiality classification engine 210 may classify changed blocks and not classify unchanged blocks. For example, the artificiality classification engine 210 may determine which of the changed blocks are natural and artificial without determining which of the unchanged blocks are natural and artificial.

The artificiality classification engine 210 may determine for each block in the video frame whether the block is natural or artificial based on the content of that block. The artificiality classification engine 210 may analyze the video frame in a single color space or in a plurality of color spaces to determine whether the block is natural or artificial. For example, the artificiality classification engine 210 may analyze the video frame in an RGB color space, a YCBCR color space, or the like to determine whether the blocks are natural or artificial.

In an example, the artificiality classification engine 210 may analyze a gray-scale diversity ratio to determine whether the blocks are natural or artificial. The gray-scale diversity ratio may be calculated for luma blocks, chroma blocks, red blocks, green blocks, blue blocks, or the like. In some examples, the artificiality classification engine 210 may compute the gray-scale diversity ratio by dividing the number of distinct gray-scale values in a block being analyzed by the total number of pixels in the block. In an example, the artificiality classification engine 210 may compute the gray-scale diversity ratio by determining the number of distinct gray-scale values in the block without dividing by the total number of pixels. The artificiality classification engine 210 may compare the gray-scale diversity ratio or number of distinct gray-scale values to a threshold to determine whether the block is natural or artificial. For example, the artificiality classification engine 210 may classify the block as natural if the number of distinct gray-scale values is greater than or at least two, three, five, ten, twenty, or the like.

In an example, the artificiality classification engine 210 may analyze the saturation of a plurality of channels to determine whether the block is natural or artificial. The channels may be color channels, such as red, green, or blue, or luma and chroma channels. The artificiality classification engine 210 may compare maximum saturation values for a plurality of channels to determine whether the block is natural or artificial. The artificiality classification engine 210 may compute a difference between a maximum saturation value of a first color channel and a maximum saturation value of a second color channel, and the artificiality classification engine 210 may determine whether the difference is less than or at most a first threshold or greater than or at least a second threshold to determine whether the block is natural or artificial. In an example, the artificiality classification engine 210 may compute a plurality of differences for a plurality of channel pairs and compare a maximum of the plurality of differences to the first and second thresholds.

The artificiality classification engine 210 may compute a saturation metric according to the equation:

$$\text{Saturation Metric} = \max[abs(R-G), abs(R-B), abs(G-B)]$$

Where R, G, and B are the largest red, green, and blue gray scale values respectively in the block being analyzed. In an example, the block may be classified as natural if the saturation metric is greater than or at least five, ten, twelve, fifteen, seventeen, twenty, or the like, or the block may be classified as natural if the saturation metric is less than or at most 40, 45, 47, 50, 52, 55, or the like.

In an example, the artificiality classification engine 210 may analyze a gray-scale histogram to determine whether the block is natural or artificial. The gray-scale histogram may be a histogram for luma blocks, chroma blocks, red blocks, green blocks, blue blocks, or the like. The artificiality classification engine 210 may generate the gray-scale histogram for a block to be analyzed. In some examples, the gray-scale histogram may be a normalized histogram. In an example, the artificiality classification engine 210 may compute a smoothness parameter of the histogram. The artificiality classification engine 210 may compare the smoothness to a threshold determine whether the block is natural or artificial. In an example, the artificiality classification engine 210 may compute the smoothness parameter by computing the kernel of the gray-scale histogram. The artificiality classification engine 210 may determine the block is natural if the smoothness parameter is less than or at most 0.05, 0.1, 0.15, 0.2, 0.25, 0.03, or the like.

In an example, the artificiality classification engine 210 may analyze a single factor, such as one of the gray-scale diversity ratio, the saturation, and the gray-scale histogram, to determine whether the block is natural or artificial. In some examples, the artificiality classification engine 210 may analyze a plurality of factors to determine whether the block is natural or artificial. For example, the artificiality classification engine 210 may analyze the gray-scale diversity ratio, the saturation, and the gray-scale histogram. The artificiality classification engine 210 may determine the block is natural if all of the factors indicate the block is natural, if most of the factors do so, if any of the factors do so, if a predetermined number or percentage of the factors do so, or the like.

In some examples, the gray-scale diversity ratio, the saturation, the gray-scale histogram, etc. may be computed for multiple channels (e.g., a red channel, a green channel, a blue channel, a luma channel, a chroma channel, etc.) or multiple sets of channels (e.g., RGB channels, YCBCR channels, etc.). The artificiality classification engine 210 may determine multiple results for each factor due to analyzing multiple channels or sets of channels. The artificiality classification engine 210 may combine the results for the channels or sets of channels in each factor prior to combining the results for the factors, may combine the results from all the channels and all the factors at one time with or without weighting the results from different channels or factors, or the like.

The thresholds for various factors or channels may be determined based on deep learning. For example, a library of blocks from video frames may be provided. The blocks may have been classified as natural and artificial, or the blocks may be or may have been classified based on which compression technique performs better. The library of images may be analyzed to determine which thresholds classify the images with the fewest errors. In an example, the artificiality classification engine 210 may include a neural network to determine whether the blocks are natural or artificial. The weights of the neural network may be selected based on the library of blocks (e.g., using backpropagation or the like).

The system 200 may include a latency engine 250. In some examples, the system 200 may transmit the compressed video to a recipient over a network. The latency engine 250 may determine the latency for the packets of video transmitted to the recipient. For example, the recipient may report the latency to the latency engine 250, or the latency engine 250 may measure the latency periodically or aperiodically by requesting responses from the recipient. The system 200 may include a block size engine 260 and an update engine 270, which may each receive an indication of the latency from the latency engine 250. The latency engine 250 may also, or instead, determine a bandwidth achieved by transmissions to the user.

The block size engine 260 may determine what size blocks should be analyzed by the artificiality classification engine 210. The block size engine 260 may determine the block size based on the latency, the bandwidth, the particular channels being analyzed by the artificiality classification engine 210, the content being compressed, the compression techniques being used, or the like. The block size engine 260 may increase the block size when the latency is high to reduce processing time, and the block size engine 260 may decrease the block size when the latency is low to improve the compression performance. Some channels may be subsampled. For example, a chroma channel may be subsampled relative to the luma channel, so the block size engine 260 may select a chroma block with half the height and half the width of a corresponding luma block. In some examples, the user may select a permanent block size, or the user may select a base block size that may be dynamically modified (e.g., based on latency, channel being analyzed, etc.).

The update engine 270 may decide how often to update the determination of which blocks are natural and artificial. The update engine 270 may update the determination of which blocks are natural and artificial every frame, every other frame, every third frame, every fourth frame, every anchor frame, or the like. In some examples, the update engine 270 may decide how often to update the determination based on the latency, the bandwidth, the content being compressed, the compression techniques being used, or the like. For example, the update engine 270 may decide to have less frequent updates when the latency is high to reduce processing time. The update engine 270 may decide to have more frequent updates when the latency is low to improve the compression performance. In some examples, the user may select a permanent update rate, or the user may select a base update rate that may be dynamically modified (e.g., based on latency or the like).

The system 200 may include a metadata engine 280. The metadata engine 280 may generate metadata identifying which blocks were determined to be natural and which blocks were determined to be artificial. In an example, the artificiality classification engine 210 may indicate to the metadata engine 280 the blocks determined to be natural and the blocks determined to be artificial, and the metadata engine 280 may generate the metadata accordingly. In some examples, the metadata engine 280 may generate metadata representative of the block size or the update frequency.

The system 200 may include a first compression engine 220 and a second compression engine 230. The first compression engine 220 may encode natural blocks with a first compression technique, and the second compression engine 230 may encode artificial blocks with a second compression technique, which may be different from the first compression technique. For example, the first compression technique may perform better at compressing natural blocks, and the second compression technique may perform better at compressing artificial blocks. In an example, the artificiality classification engine 210 may remove all blocks not classified as natural from the video frame, for example, by replacing those blocks with a minimum value, zeroes, a maximum value, or the like. The artificiality classification engine 210 may provide the resulting video frame to the first compression engine 220. The artificiality classification engine 210 may remove all blocks not classified as artificial from the video frame and provide the resulting video frame to the second compression engine 230. In some examples, the artificiality classification engine 210 may provide the original video frame to the first and second compression engines 220, 230. The artificiality classification engine 210 may indicate the natural blocks to the first compression engine 220 and the artificial blocks to the second compression engine 230. The first and second compression engines 220, 230 may be responsible for compressing the relevant blocks and discarding the irrelevant blocks.

The metadata, output from the first compression engine 220, and output from the second compression engine 230 may be transmitted to the recipient. The recipient may use first and second decoders to decode the outputs from the first and second compression engines 220, 230. The results from the decoders may be combined to produce the reconstructed video frame, which may be displayed to a user. In some examples, the recipient may use the metadata to decode and reconstruct the video frame. In an example, the recipient may not need metadata to reconstruct the video frame, and the metadata engine 280 may be omitted from the system 200.

FIG. 3 is a flow diagram of an example method 300 to compress video efficiently. A processor may perform the method 300. At block 302, the method 300 may include, for each block in a video frame, determining whether the block is natural or artificial based on the content of that block. For example, the gray-scale values of pixels in each the block may be analyzed to determine whether the block is more likely to contain natural or artificial content. Each block may be classified based on the determination of whether it has natural or artificial content.

At block 304, the method 300 may include generating metadata identifying which blocks were determined to be natural and which blocks were determined to be artificial. The metadata may include a compact indication of which blocks were classified as natural and which blocks were classified as artificial. At block 306, the method 300 may include compressing the natural blocks with a first compression technique and the artificial blocks with a second compression technique. For example, the first compression technique may compress natural blocks to a more compact size than the second compression technique, and the second compression technique may compress artificial blocks to a more compact size than the first compression technique.

At block 308, the method 300 may include transmitting the metadata, a first compressed frame corresponding to the natural blocks, and a second compressed frame corresponding to the artificial blocks. The first compressed frame corresponding to the natural blocks may be the output from the first compression technique, and the second compressed frame may be the output from the second compression technique. The metadata, first compressed frame, and second compressed frame may be usable by a recipient to reconstruct the original video frame. In an example, the artificiality classification engine 110 of FIG. 1 may determine whether each block is natural or artificial; the metadata engine 280 of FIG. 2 may generate metadata identifying which blocks were classified as natural and artificial; the first and second compression engines 120, 130 of FIG. 1 may compress the blocks with the first and second compression techniques; and the metadata engine 280 of FIG. 2, the first compression engine 120 of FIG. 1, or the second compression engine 130 of FIG. 1 may transmit the metadata, first compressed frame, and second compressed frame.

FIG. 4 is a flow diagram of another example method 400 to compress video efficiently. A processor may perform the method 400. At block 402, the method 400 may include converting a video frame from a first color space to a second color space. For example, the video frame may be converted from an RGB color space to a YCBCR color space, from a YCBCR color space to an RGB color space, or the like. The conversion may allow a channel in the second color space to be analyzed to classify blocks of the video frame in addition to or instead of a channel in the first color space. The version of the video frame in the first color space may be retained or discarded.

At block 404, the method 400 may include deciding which blocks have changed from a previous video frame. For example, each block in the current video frame may be compared pixel-by-pixel to the same block in the previous video frame to determine whether any gray-scale values have changed. In an example, unchanged blocks may not be analyzed further whereas changed blocks may be further classified as natural or artificial. A block may be classified as unchanged if no gray-scale values have changed from the previous video frame, if the gray-scale values have changed by less than a predetermined amount or percentage, or the like.

Block 406 may include determining, for each changed block in the video frame, whether that block is natural or artificial. The content of the block may be analyzed to determine whether the block is natural or artificial. Analyzing the content of the block may include calculating a gray-scale diversity ratio, analyzing a saturation, analyzing a gray-scale histogram, or the like to determine whether the block is natural or artificial. The results may be compared to thresholds or evaluated with deep learning to determine whether the block is natural or artificial. In an example, determining whether the block is natural or artificial may include determining whether that block will be compressed to a more compact size by the first compression technique or the second compression technique, which may approximately correspond to whether the block is natural or artificial.

Block 408 may include generating metadata identifying which blocks were determined to be natural and which blocks were determined to be artificial. Generating the metadata may include generating any metadata used to reconstruct the video frame. The metadata may include which blocks were compressed with each technique, demarcations of the start or end of the first or second compressed frames, block size, how frequently the block classifications are updated, or the like. The metadata may be generated in a compact format to minimize the overhead included with the compressed video frames.

At block 410, the method 400 may include compressing the natural blocks with a first compression technique and compressing the artificial blocks with a second compression technique. The first and second compression techniques may be different from each other. The first compression technique may be able to compress natural blocks to a more compact size than the second compression technique, and the second compression technique may be able to compress artificial blocks to a more compact size than the first compression technique. Accordingly, each block may be compressed with the technique that will achieve the best performance. In an example, the first compression technique may be applied to a first copy of the video frame with all blocks not classified as natural replaced with a null value, such as zeroes, and the second compression technique may be applied to a second copy of the video frame with all blocks not classified as artificial replaced with a null value, such as zeroes.

At block 412, the method 400 may include transmitting the metadata, a first compressed frame corresponding to the natural blocks, and a second compressed frame corresponding to the artificial blocks. The first compressed frame corresponding to the natural blocks may be the first copy of the video frame after being compressed using the first compression technique. The second compressed frame corresponding to the artificial blocks may be the second copy of the video frame after being compressed using the second compression technique. The metadata, first compressed frame, and second compressed frame may be transmitted to a single recipient or broadcast to a plurality of recipients. The recipient may reconstruct the video frame by uncompressing the first and second compressed frames and combining the uncompressed first and second frames. Because the first and second compressed frames include null values for some blocks, the additional overhead from transmitting two frames may be minimal or nonexistent. Any additional overhead may be compensated for by the increased compression performance.

Block 414 may include deciding how often to update the determination of natural and artificial blocks. The update frequency may be decided based on the latency available, the bandwidth available, the content being compressed, the compression techniques being used, or the like. Updating more frequently may increase latency but save bandwidth. If network latency is high or much bandwidth is available, the determination may be updated less frequently to reduce latency. In contrast, if network latency is low or little bandwidth is available, the determination may be updated more frequently to reduce bandwidth used. For some content, the determination may change little between video frames, so there may be little benefit to updating the determination frequently. In some examples, a user may have indicated whether to use a static update frequency or whether to dynamically change the update frequency, and the user may have indicated the update frequency to be used.

At block 416, the method 400 may include updating the determinations of natural and artificial blocks for another video frame. For example, the update frequency may be every video frame, every second video frame, every third video frame, every fourth video frame, every fifth video frame, every frame that will be used by one of the compression techniques as an anchor frame, or the like. Accordingly, the determination of natural and artificial blocks may be updated for a next video frame immediately following the current video frame or another video frame a predetermined number of frames after the current video frame. Referring to FIG. 2, in an example, the color space conversion engine 240 may perform block 402; the artificiality classification engine 210 may perform block 404, 406, or 416; the metadata engine 280 may perform block 408 or 412; the first and second compression engines 220, 230 may perform block 410 or 412; and the update engine 270 may perform block 414.

Figure 5:
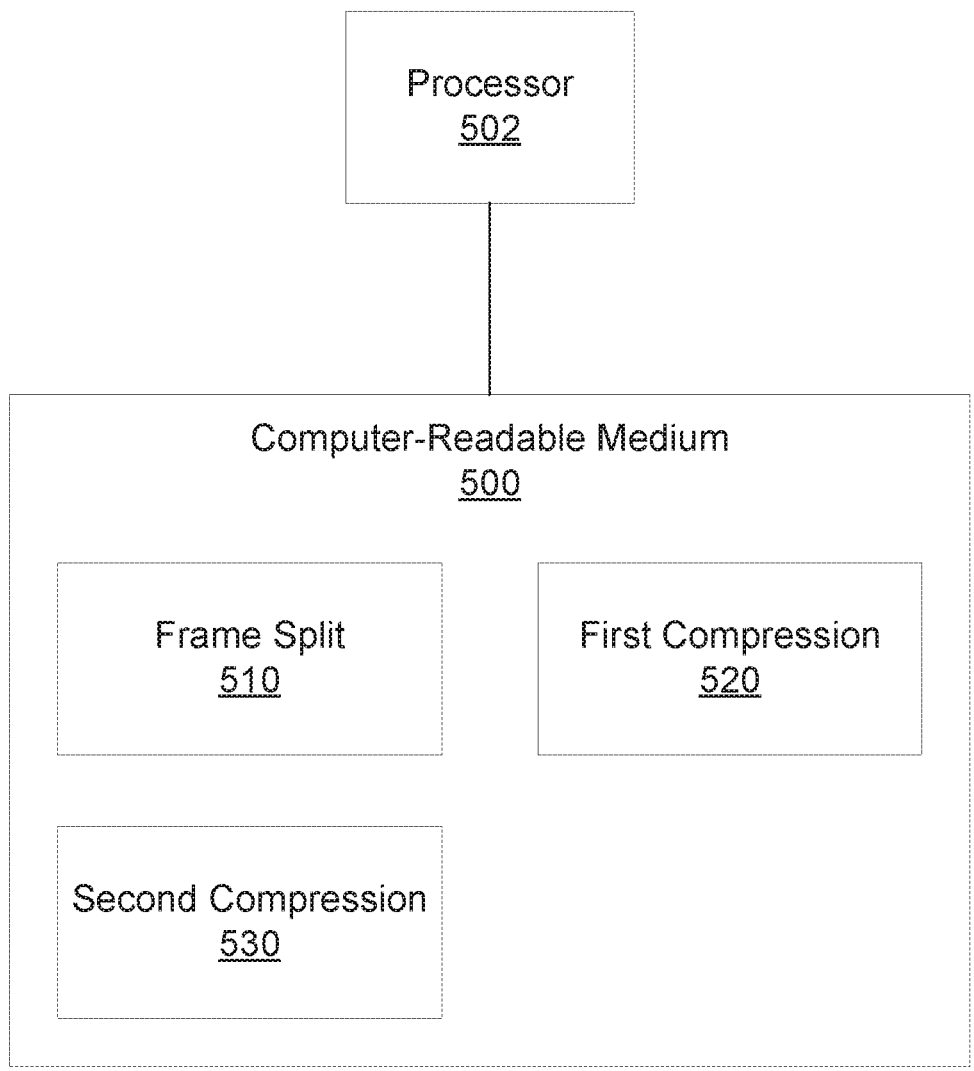
FIG. 5 is a block diagram of an example computer-readable medium including instructions that cause a processor to compress video efficiently.

FIG. 5 is a block diagram of an example computer-readable medium 500 including instructions that, when executed by a processor 502, cause the processor 502 to compress video efficiently. The computer-readable medium 500 may be a non-transitory computer readable medium, such as a volatile computer readable medium (e.g., volatile RAM, a processor cache, a processor register, etc.), a non-volatile computer readable medium (e.g., a magnetic storage device, an optical storage device, a paper storage device, flash memory, read-only memory, non-volatile RAM, etc.), and/or the like. The processor 502 may be a general purpose processor or special purpose logic, such as a microprocessor, a digital signal processor, a microcontroller, an ASIC, an FPGA, a programmable array logic (PAL), a programmable logic array (PLA), a programmable logic device (PLD), etc.

The computer-readable medium 500 may include a frame split module 510. As used herein, a "module" (in some examples referred to as a "software module") is a set of instructions that when executed or interpreted by a processor or stored at a processor-readable medium realizes a component or performs a method. The frame split module 510 may include instructions that, when executed, cause the processor 502 to split a video frame into a first frame including blocks classified as natural and a second frame including blocks classified as artificial. The frame split module 510 may cause the processor 502 to split the video frame by copying the video frame and removing the blocks not classified as natural from the first frame and the blocks not classified as artificial from the second frame.

The computer-readable medium 500 may include a first compression module 520 and a second compression module 530. The first compression module 520 may cause the processor 502 to compress the first frame with a first compression technique, and the second compression module 530 may cause the processor 502 to compress the second frame with a second compression technique. The first and second compression modules 520, 530 may cause the processor 502 to produce first and second compressed frames. The first compressed frame may include a compressed version of the natural blocks, and the second compressed frame may include a compressed version of the artificial blocks. Referring to FIG. 1, for example, when executed by the processor 502, the frame split module 510 may realize the artificiality classification engine 110, the first compression module 520 may realize the first compression engine 120, and the second compression module 530 may realize the second compression engine 130.

Figure 6:
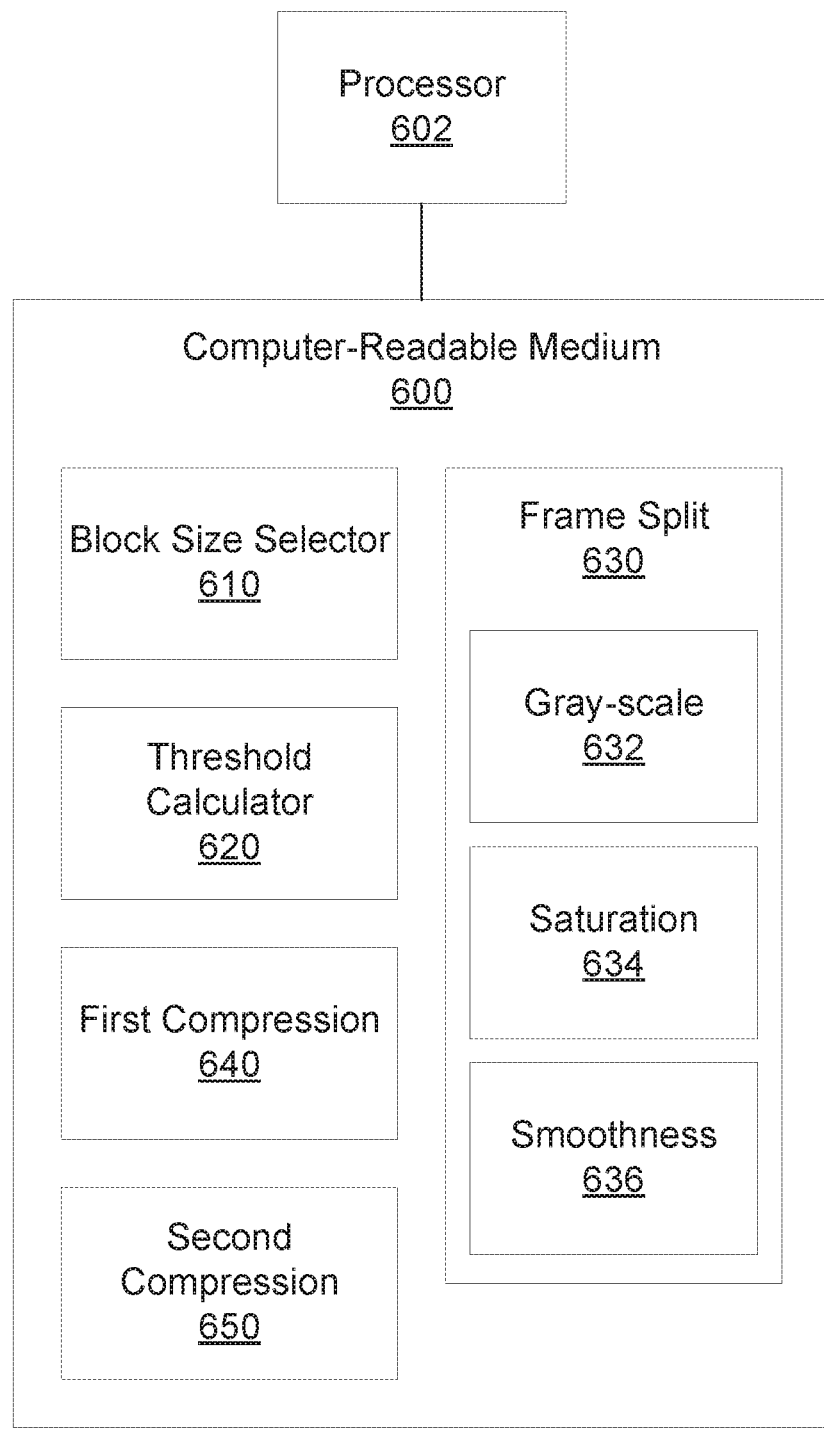
FIG. 6 is a block diagram of another example computer-readable medium including instructions that cause a processor to compress video efficiently.

FIG. 6 is a block diagram of another example computer-readable medium 600 including instructions that, when executed by a processor 602, cause the processor 602 to compress video efficiently. The computer-readable medium 600 may include a block size selector module 610. The block size selector module 610 may cause the processor 602 to select a block size based on at least one of a latency available, a bandwidth available, the particular channels being analyzed, the content being compressed, the compression techniques being used, a user indication, or the like. For example, the block size selector module 610 may cause the processor 602 to select a larger block size when network latency is high, much bandwidth is available, a channel has not been subsampled, the content will have little area misclassified by using a larger block size, or the like. In some examples, the block size selector module 610 may select a block size indicated by a user or a block size that works well with or is specified by a compression technique being used.

The computer-readable medium 600 may include a threshold calculator module 620. Each block of a video frame may be classified by comparing a characteristic of pixels in that block to a threshold. The threshold calculator module 620 may cause the processor 602 to determine the threshold. For example, the threshold may be preprogrammed, indicated by a user, or the like. In some examples, the threshold calculator module 620 may cause the processor 602 to determine the threshold based on deep learning. For example, the threshold calculator module 620 may cause the processor 602 analyze a library of video frames or blocks from video frames. The blocks may have been previously classified as natural or artificial or previously compressed to determine which compression technique performed better, and the results may be saved with the library. In some examples, the threshold calculator module 620 may cause the processor 602 to compress the blocks to determine which compression technique performs better (e.g., by instructing first and second compression modules 640, 650 to cause the processor 602 to compress each block). The threshold calculator module 620 may cause the processor 602 to select a threshold that minimizes classification errors for the library of video frames or blocks from video frames. In some examples, the threshold calculator module 620 may cause the processor 602 to continually update the library or the threshold, for example, by selecting video frames or blocks for addition or further analysis periodically, aperiodically, pseudorandomly, or the like.

The computer-readable medium 600 may include a frame split module 630. The frame split module 630 may cause the processor 602 to split a video frame into a first frame including blocks classified as natural and a second frame including blocks classified as artificial. The frame split module 630 may cause the processor 602 to classify the blocks based on a block size received from the block size selector module 610 and a threshold received from the threshold calculator module 620. The frame split module 630 may include a gray-scale module 632, a saturation module 634, or a smoothness module 636 to analyze and classify the blocks as natural or artificial. The frame split module 630 may cause the processor 602 to combine the outputs from the gray-scale module 632, the saturation module 634, or the smoothness module 636 to produce a final classification for each block in the video frame. In an example, the frame split module 630 may cause the processor 602 to apply weights calculated by the threshold calculator module 632 when combining the results from the gray-scale module 632, the saturation module 634, or the smoothness module 636.

The gray-scale module 632 may cause the processor 602 to calculate a gray-scale diversity ratio for the block. In some examples, the denominator may be omitted when calculating the gray-scale diversity ratio. The gray-scale module 632 may cause the processor 602 to determine the number of distinct gray-scale values in the block, for example, for a particular channel. The gray-scale module 632 may cause the processor 602 to classify each block as natural or artificial based on whether the number of distinct gray-scale values exceeds or is at least a threshold, such as a threshold received from the threshold calculator module 620.

The saturation module 634 may cause the processor 602 to calculate a relative saturation for a plurality of channels. For example, the saturation module 634 may cause the processor 602 to compare the maximum gray-scale values for a plurality of channels. In an example, the saturation module 634 may cause the processor 602 to determine a block is artificial if the maximum gray-scale values between any pair of channels are too far apart or if the maximum gray-scale values for every pair of channels is too close together. The threshold calculator module 620 may cause the processor 602 to determine thresholds for determining when the gray-scale values are too far apart or too close together.

The smoothness module 636 may cause the processor 602 to calculate a smoothness of a histogram of gray-scale values. In some examples, the smoothness module 636 may cause the processor 602 to calculate the smoothness of a normalized histogram of gray-scale values. The smoothness module 636 may cause the processor 602 to calculate the smoothness by calculating a kernel of the histogram. The smoothness module 636 may cause the processor 602 to classify each block as natural or artificial based on whether the smoothness exceeds or is at least a threshold, such as a threshold received from the threshold calculator module 620.

The frame split module 630 may cause the processor 602 to provide the first frame to a first compression module 640 and the second frame to a second compression module 650. The first compression module 640 may cause the processor 602 to compress the first frame with a first compression technique, and the second compression module 650 may cause the processor 602 to compress the second frame with a second compression technique. For example, the first compression technique may compactly compress natural blocks, and the second compression technique may be different from the first and may compactly compress artificial blocks. In an example, when executed by the processor 602, the block size selector module 610 may realize the block size engine 260 of FIG. 2; the threshold calculator module 620 and frame split module 630 may realize the artificiality classification engine 210; the first compression module 640 may realize the first compression engine 220; and the second compression module 650 may realize the second compression engine 230.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. A system comprising:
a classification engine to determine for each block in a video frame whether the block is natural or artificial based on content of that block, including, by comparing maximum saturation values for a plurality of color channels to determine whether the block is natural or artificial, and wherein the maximum saturation value for each color channel is the largest gray scale value for that color channel in the block being analyzed;
a first compression engine to encode natural blocks with a first compression technique; and
a second compression engine to encode artificial blocks with a second compression technique different from the first compression technique,
wherein the first compression technique is able to compress natural blocks more efficiently than the second compression technique is able to, and the second compression technique is able to compress artificial blocks more efficiently than the first compression technique is able to.

2. The system of claim 1, wherein the classification engine is to compare the number of distinct gray-scale values in the block to a threshold to determine whether the block is natural or artificial.

3. The system of claim 1, wherein the classification engine is to compute a difference between a maximum saturation value of a first color channel and a maximum saturation value of a second color channel and to determine whether the difference is less than a first threshold or greater than a second threshold to determine whether the block is natural or artificial.

4. The system of claim 3, wherein the classification engine is to compute a plurality of differences for a plurality of color channel pairs and to determine whether a maximum of the plurality of differences is less than the first threshold or greater than the second threshold.

5. A method, comprising:
determining for each block in a video frame whether the block is natural or artificial based on content of that block, including:
determining a maximum grayscale value of a first color channel for pixels in the block,
determining a maximum grayscale value of a second color channel for the pixels in the block, and
comparing the maximum grayscale value of the first color channel to the maximum grayscale value of the second color channel to determine whether the block is natural or artificial;
generating metadata identifying which blocks were determined to be natural and which blocks were determined to be artificial;
compressing the natural blocks with a first compression technique and the artificial blocks with a second compression technique, wherein the first compression technique is able to compress natural blocks more efficiently than the second compression technique is able to, and the second compression technique is able to compress artificial blocks more efficiently than the first compression technique is able to; and
transmitting the metadata, a first compressed frame corresponding to the natural blocks, and a second compressed frame corresponding to the artificial blocks.

6. The method of claim 5, further comprising updating the determination of natural and artificial blocks for a next video frame immediately following the video frame.

7. The method of claim 5, further comprising deciding how often to update the determination of natural and artificial blocks based on a latency.

8. The method of claim 5, further comprising initially deciding which blocks have changed from a previous video frame and which blocks are unchanged, wherein the determining of which blocks are natural and artificial comprises determining which of the changed blocks are natural and artificial without determining which of the unchanged blocks are natural and artificial.

9. The method of claim 5, further comprising initially converting the video frame from a red, green, blue color space to a luma, chroma color space, wherein the determining for each block in a video frame whether the block is natural or artificial comprises analyzing at least one of luma blocks and chroma blocks.

10. A non-transitory computer-readable medium comprising instructions that, when executed by a processor, cause the processor to:
determine for each block in a video frame whether the block is natural or artificial based on pixels of that block, including, by comparing maximum saturation values for a plurality of color channels to determine whether the block is natural or artificial, and wherein the maximum saturation value for each color channel is the largest gray scale value for that color channel in the block being analyzed;
split the video frame into a first frame including blocks classified as natural and a second frame including blocks classified as artificial;
compress the first frame with a first compression technique; and
compress the second frame with a second compression technique,
wherein the first compression technique is able to compress natural blocks more efficiently than the second compression technique is able to.

11. The computer-readable medium of claim 10, further comprising instructions that cause the processor to classify each block in the video frame as natural or artificial based on the number of distinct gray-scale values in the block.

12. The computer-readable medium of claim 10, further comprising instructions that cause the processor to classify each block in the first frame as natural or artificial based on a smoothness of a normalized histogram of gray-scale values.

13. The computer-readable medium of claim 10, further comprising instructions that cause the processor to classify each block in the first frame as natural or artificial based on comparing a characteristic of pixels in the block to a threshold, wherein the threshold is determined based on deep learning.

14. The computer-readable medium of claim 10, further comprising instructions that cause the processor to select a block size based on at least one of a user indication and a latency.

15. The system of claim 1, wherein the first compression technique comprises H.264 standard technique and wherein the second compression technique comprises a High Efficiency Video Coding (HEVC) standard technique.

16. The computer-readable medium of claim 12, wherein the instructions include instructions that cause the processor to compute the smoothness of the normalized histogram of gray-scale values by computing a kernel of the histogram.

17. A system comprising:
  a classification engine to determine for each block in a video frame whether the block is natural or artificial based on pixels of that block;
  a first compression engine to encode natural blocks with a first compression technique; and
  a second compression engine to encode artificial blocks with a second compression technique different from the first compression technique,
  wherein the classification engine is to compare maximum saturation values for a plurality of color channels to determine whether the block is natural or artificial, and
  wherein the classification engine is to compute a difference between a maximum saturation value of a first color channel and a maximum saturation value of a second color channel and to determine whether the difference is less than a first threshold or greater than a second threshold to determine whether the block is natural or artificial, and wherein the maximum saturation value for each color channel is the largest gray scale value for that color channel among the pixels in the block being analyzed.

18. The computer-readable medium of claim 12, wherein the instructions cause the processor to compute the smoothness by calculating a kernel of the histogram.

19. The computer-readable medium of claim 18, wherein the instructions cause the processor to determine the block is natural based on the smoothness parameter being less than or at most a threshold, and wherein the threshold is selected from the group consisting of 0.05, 0.1, 0.15, 0.2, or 0.25.

* * * * *